United States Patent [19]

Parsons

[11] Patent Number: 4,820,248
[45] Date of Patent: Apr. 11, 1989

[54] BELT FOR USE IN A TRANSMISSION SYSTEM

[75] Inventor: Frederick L. Parsons, Pearce, Ariz.

[73] Assignee: Neuberne H. Brown, Jr., Jensen Beach, Fla. ; a part interest

[21] Appl. No.: 168,858

[22] Filed: Mar. 16, 1988

[51] Int. Cl.$^4$ ............................ F16H 9/16; F16G 1/08
[52] U.S. Cl. ..................................... 474/268; 474/272
[58] Field of Search ............... 474/237, 201, 239, 240, 474/242, 244, 250, 265, 261, 268, 272, 29, 8, 270, 271; 156/137–139; 428/465

[56] References Cited

U.S. PATENT DOCUMENTS

| | | | |
|---|---|---|---|
| 3,102,431 | 9/1963 | Maurer | 474/29 |
| 3,757,594 | 9/1973 | Kumm | 474/28 |
| 3,968,703 | 7/1976 | Bellman | 474/250 |
| 4,650,442 | 3/1987 | Parsons | 474/268 X |

OTHER PUBLICATIONS

"Gearless Transmissions Shift Out of 'Park'", *Business Week*, Feb. 6, 1984, pp. 74–75.
"CVT-The No-Shift Transmission", *Poplar Science*, Jun. 1980 , pp. 88–89.

*Primary Examiner*—Thuy M. Bui
*Attorney, Agent, or Firm*—Brumbaugh, Graves, Donohue & Raymond

[57] ABSTRACT

A belt for use in coupling the driving and driven pulleys of a continuously variable transmission includes a rubber-like resilient matrix in which are embedded longitudinal cables for carrying the torque and a metallic grid member for providing contact with the sidewalls of the pulleys. The grid member includes a main sheet portion embedded in the matrix and having a plurality of transverse slots arranged in two interdigital sets for defining two sets of flexible fingers on opposite sides of the sheet portion that extend vertically included to form surfaces for contacting the sidewalls of the pulleys.

8 Claims, 2 Drawing Sheets

BELT FOR USE IN A TRANSMISSION SYSTEM

BACKGROUND OF THE INVENTION

This invention relates to a variable speed transmission system in which the ratio between a driving pulley and a driven pulley is continuously variable. Such a transmission is generally known as a continuously variable transmission (CVT). More particularly, the invention is a belt for use in such a system.

Continuously variable transmission has long been recognized as a likely answer to more efficient automatic transmissions but CVT has been relatively slow in gaining widespread commercial use. In Business Week, Feb. 6, 1984 at pages 74–75 there is discussed the basic approach to a currently popular form of CVT. As described therein CVT works by varying the working diameters of two pulleys, each of which is characterized by a V-shaped groove in which sits the pulley belt. To shift into a lower gear, the engine pulley spreads apart dropping the belt lower into its V-shaped groove and at the same time, the driven shaft pulley closes, forcing the belt to ride higher in its V-groove, thereby effectively decreasing the ratio of the diameters of the engine pulley and the drive shaft pulley.

A critical element of such a system is the belt used. Typically there is used a flexible steel belt with hundreds of steel plates strung together like the links of a watch band. In such a system, the drive shaft pulley pushes the driven shaft pulley into rotation by means of the segments of the belt which are pinched between the sidewalls of the respective groove.

An oil film is included between the walls of the groove formed by the pulley walls and the tips or edges of the steel belt to facilitate displacement of the belt when a speed change is made. Unfortunately, this oil film requires a very high contact force to enable the system to transfer torque between the pulleys and the drive belt. It is of course important that adequate clamping be maintained between the belt and the pulleys if either pulley is to drive the belt or be driven by the belt without slipping. In particular, it is advantageous that the clamping force be proportional to the torque being transmitted. Moreover, it is important that these high clamping forces be little affected by shock or other load changes. Prior art CVTs have been deficient in these respects.

SUMMARY OF THE INVENTION

In my earlier patent, U.S. Pat. No. 4,650,442, there is described a CVT that uses essentially a dry metal-to-metal contact between the walls of the groove and the belt to provide a contact that is essentially slipless. This belt included a rubber matrix in which were embedded spaced transversely extending metal bands having bent unembedded end portions whose tips were ground to an angle matching the tape of the sidewalls of the grooves which such tips are to contact. The belt also included a plurality of embedded longitudinal cables that carry the torque.

The present invention relates to an improved belt for use in a CVT. More specifically, a belt in accordance with the invention includes a metal grid-like member with transversely located flex fingers having free ends that conform effectively to the sidewalls of the grooves of the pulley. The grid-like member is a continuous strip of metal with transverse slots or cutouts that define discrete flexible fingers.

More particularly the basic elements of a belt in accordance with the invention include a matrix of a resilient material, such as vulcanized rubber, longitudinal cables in the matrix serving as the primary carrier of the belt torque, and a metallic grid member having a main grid sheet portion which is embedded in the matrix and from a pair of opposite edges of which extend flexible finger portions vertically from the plane of the sheet portion for providing surfaces inclined for contacting sidewalls of the pulleys.

In the preferred embodiment, the grid sheet portion includes a plurality of transverse slots for defining the flexible finger portions. The slots form two sets each extending in from an opposite one of the two edges of the sheet in an interdigital pattern. Typically, the slots have a length at least one half the width of the sheet and a width of at least the thickness of the sheet. The optimum design generally will be dictated by the particulars of the CVT in which the belt is to be used.

The invention will be better understood from the following more detailed description taken in conjunction with the accompanying drawing.

Figure 1:
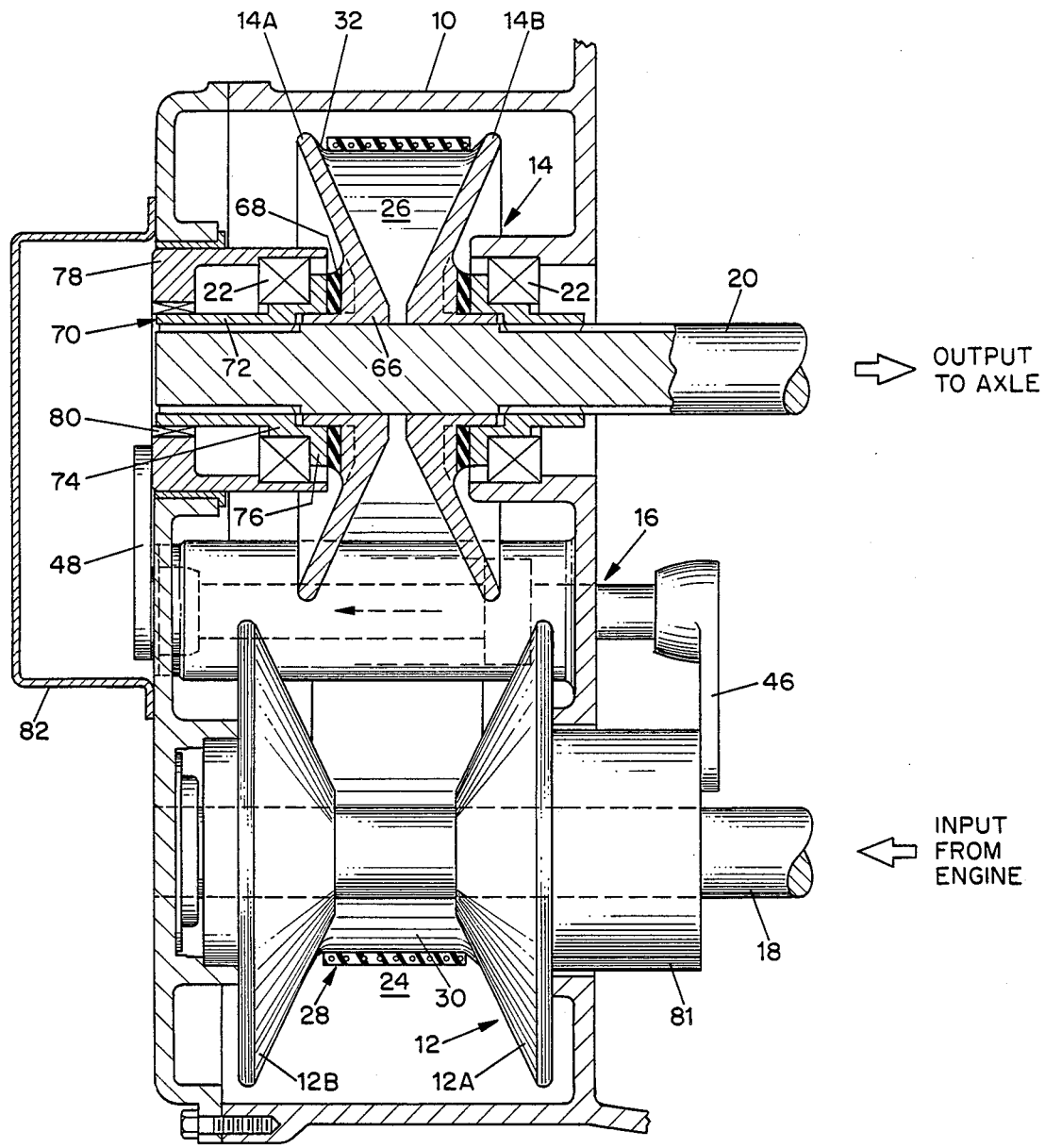
FIG. 1 shows the CVT described in the aforementioned patent in which the belt of the invention can be employed.

It is to be noted that the drawing is not to scale.

DETAILED DESCRIPTION

Turning now more specifically to the drawing, in FIG. 1 there is shown a CVT of the kind which is described in my aforementioned patent and in which a belt in accordance with the invention typically may be used. In this CVT, the transmission housing 10 supports within its interior the engine pulley 12 and the drive shaft pulley 14. Each of the pulleys has one sidewall fixed in the horizontal direction and the other movable in the horizontal direction, so that the spacing of the groove between the two sidewalls of each pulley is variable. The mechanism for controlling the spacing will be discussed in more detail below in conjunction with FIG. 2, but basically this mechanism is included in a hydraulic actuator unit 16. This actuator unit located between the two pulleys controls the position of the horizontally movable sidewall of each pulley. Since the movable sidewall is opposite for the two pulleys, one, for example being the right wall 12A in pulley 12 and the left wall 14A in pulley 14, movement of the horizontally movable wall 12A of pulley 12 to the left (as viewed in FIG. 1) decreases its spacing from the horizontally fixed wall 12B, whereas movement of the horizontally movable wall 14A of pulley 14 to the left increases its spacing from the horizontally fixed wall 14B. The opposite results are achieved when both walls 12A and 14A are moved to the right.

The engine pulley 12 is coupled to the shaft 18 which is linked to the engine (not shown) and the driven shaft pulley 14 is coupled to the driven shaft 20. The coupling will be described in more detail below. Bearings 22 are included to support rotation of the pulleys and shafts with respect to the housing in the usual fashion.

As is seen, the sidewalls of each of the pulleys 12 and 14 are slanted in the working parts of their widths so that the grooves 24 and 26, respectively, between the sidewalls are tapered, and their widths increase with distance from the pulley axes, which lie along the associated shafts 18 and 20, respectively.

The drive belt 28 rides between the two sidewalls of each of the two pulleys. The drive belt will be described in more detail subsequently.

When the sidewalls of pulley 12 are far apart as shown in FIG. 1, the belt 28 will be located close to the shaft 18, so that pulley 12 has a small effective radius and will make several rotations for each rotation of pulley 14 in which the belt 28 rides higher in the groove so that it has a larger effective radius. When the sidewalls of pulley 22 are moved closer together, thereby also moving the sidewalls of pulley 14 farther apart, the belt 28 will rise in pulley 12 and drop in pulley 14 and the ratio of the radii of the two pulleys will thereby change. As will be understood, FIG. 1 depicts the pulleys 12 and 14 in a very low ratio configuration, and any change would normally be in the direction of a higher ratio, i.e., so that the belt would rise in pulley 12 and drop in pulley 14.

For a detailed description of the manner of operation of this CVT, reference is made to the aforementioned patent. In particular, in this patent there are described the manner used to control the horizontal movement of the horizontally movable sidewalls 12A and 14A and thereby to effect a ratio change. Additionally, a detailed description of the manner in which shafts 18 and 20 are coupled to the sidewall members of the pulleys 12 and 14 is provided.

A drive belt 28 in accordance with the invention will now be described with reference to FIGS. 2 and 3.

Figure 2:
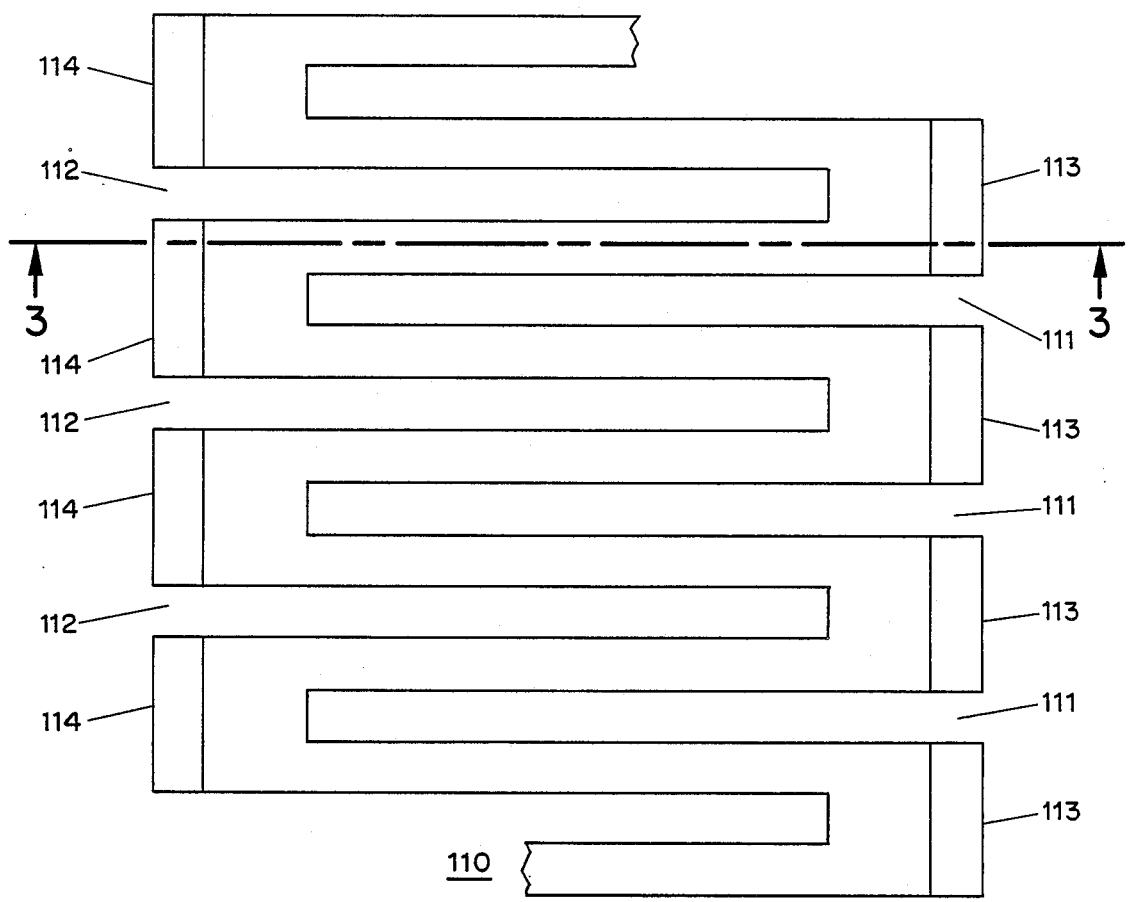
FIG. 2 shows in plan view the grid-like member that is an important feature of a belt in accordance with the invention.

In FIG. 2, there is shown a portion of a grid-like member 110, typically of hardened-steel that serves to provide the contact surfaces of the belt. The grid-like member comprises a thin sheet of metal which normally will be bent in a closed loop, typical of a drive belt. The sheet includes two sets of interdigital transverse slots, 111, 112 different ones of the two sets originating at opposite edges of the sheet, which extend a large fraction of the width of the sheet to define two sets of flexible fingers 113, 114 on opposite edges of the sheet. As seen in FIG. 3, the end 116 each finger is bent upwards to form a vertical surface that will contact one sidewall of the groove when the belt is in position. The two sets of fingers 113, 114 will form two sets of contact surfaces for opposite sidewalls of the groove.

Figure 3:
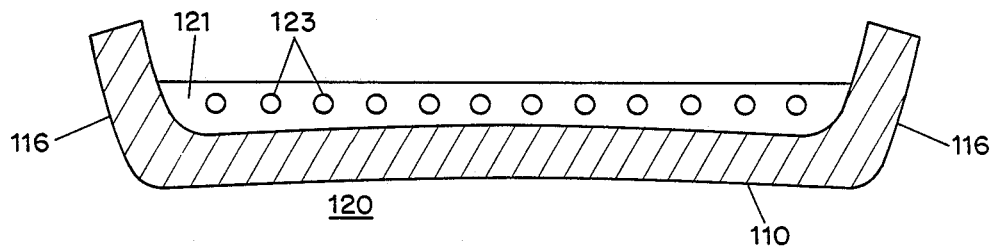
FIG. 3 shows a transverse section taken along the lines 3—3 of the grid member shown in FIG. 2.

In FIG. 3, there is shown a transverse section of a belt 120 including the grid-like member shown in FIG. 2. The horizontal portion of the grid-like member 110 is embedded in a rubber-like matrix 121 while the bent ends 116 are free of the matrix. Advantageously, the sheet portion is bowed or curved slightly upwards as shown and the free ends providing the contact surfaces are also slightly curved. These permit minor deflections to accommodate for small changes in belt width, typically several mils, to permit approaching the ideal contact contour. Also embedded in the rubber matrix are longitudinal cables 123 that carry the torque provided by the belt. Typically these cables are provided by a continuous winding around the closed loop a number of times to provide turns across much of the width of the belt. Typically, these cables are of a high tensile strength material, such as Aramid.

In a typical design the sheet of metal may be about seventy mils thick and bent into a closed loop about thirty four inches long and two and a quarter inches wide. The bent ends are each about 3/16 of an inch high and there are three bent ends per inch at each edge with a separation between bent edges of at least the thickness of the sheet. The length of each of the transverse slots is slightly less than two inches to leave unslotted at each end a portion slightly more than one half an inch of which the end third is bent upwardly to form the slightly curved contact surface.

Typically, this belt is formed by bending a steel sheet of appropriate size, in which the transverse slots have been punched out to form the finger elements and two opposed edges have been bent to form the contact surfaces, into a closed loop on a mandrel. The mandrel is thereafter coated with a suitable rubber compound to cover the steel sheet, filling the slots, and there is then wound over the bent sheet on the mandrel turns of the cable. The assembly is then heated to vulcanize the rubber compound and to fix firmly the bent grid-like sheet member and the cable turns. Typically for the design described, the final belt thickness is about ⅜ of an inch. It is advantageous to keep small the volume of rubber used to interface the grid-like member with the cable turns.

The essential consideration for maximum efficiency in the CVT is that the frictional contact between the belt and the pulley walls be a static or essentially slipfree contact at all times. A static contact is important since significant slippage in any manner represents a momentary loss of efficiency, and can, in some cases, lead to catastrophic failure. A true static contact maintains the belt and pulley elements in a fixed ratio. A major advantage of the belt described is that it maintains this necessary static at all times without the need of a lubricant. This slipfree operation results from the engineered flexibility of the contact fingers and the coupling resiliency of the grid-like member to the longitudinal cables. These insure minute incremental width adjustment for engagement and ratio changes at the contact surfaces.

Individual flex fingers remain in static engagement with the pulley sidewalls during ratio change because as the sidewalls move either closer or apart they will progressively deflect or rock to accommodate this slight change in belt width and so they are not forced out of orbit.

Incoming flex fingers will progressively adapt to new orbital diameters as they walk up or down the pulley as they move closer or apart.

A further advantage of this belt is that each individual flex finger resiliently carries only its proportional share of the torque. This resiliency compensates for tolerance differences and chordal tendencies, and contributes to vibration damping and noise suppression.

This belt makes uses of two characteristics of rubber, its sheer and its compression properties. In converting the torque of the driver pulley into a corresponding force in the drive belt, a minute speed difference is experienced.

The transfer of force is zero at the moment of initial contact of the bent end of the first flex finger and power commences to flow between the pulley and the drive belt only after there is a linear displacement placing the rubber in shear. Every following flex finger goes through the same process.

Since the cables are of fixed length and the flex fingers are statically locked to the pulley, the shear displacement of each incoming finger is felt by the entire driving contact. This means that at each contact for the approximate 180° of driving engagement, there is a progressive increase in tension in the rubber from zero at entrance to a maximum at exit. This gradual increase in the load throughout the time of driving contact assures very low incipient slippage, the cause of wear and tear. This insures long life for the belt. Past the exit point of departure, the sheer stress will relax back to neutral.

Additionally, the rubber in the slot between fingers is in compression and acts as a damper to spread the load carrying ability of the belt beyond the actual contacts, thus enhancing its capacity.

It is to be understood that the specific embodiment described is merely illustrative of the general principles of the invention. Particular applications may favor modifications that are still consistent with these general principles. In particular, the materials used in the belt and the dimensions of its various elements may readily be varied.

I claim:

1. In a continuously variable transmission that includes a driving pulley and a driven pulley, a belt for transmitting torque between the two pulleys comprising a resilient matrix, longitudinal means embedded within the resilient matrix for carrying the belt torque, and a metallic grid member including a main sheet portion embedded within the resilient matrix and free flexible finger portions extending from a pair of opposite edges of the main sheet portion and bent to form tapered surfaces for contacting sidewalls of the pulleys.

2. The belt of claim 1 further characterized in that the main sheet portion includes a plurality of transverse slots filled with the resilient matrix for defining the flexible finger portions.

3. The belt of claim 2 in which the transverse slots extend from opposite edges of the main sheet portion interdigitally.

4. The belt of claim 3 in which the transverse slots are at least as wide as the thickness of the main sheet portion.

5. The belt of claim 2 in which the resilient matrix is of vulcanized rubber.

6. The belt of claim 2 in which the transverse slots extend at least one half the width of the main sheet portion.

7. The belt of claim 2 in which the main sheet portion is slightly bowed for flexibility and the tapered surfaces are slightly curved to accommodate slight changes in belt width.

8. The belt of claim 7 in which the traverse slots extend from opposite edges of the main sheet portion interdigitally at least one half the width of the main sheet portion and are at least as wide as the thickness of the main sheet portion.

* * * * *